US006691892B2

(12) United States Patent
Odessa

(10) Patent No.: US 6,691,892 B2
(45) Date of Patent: Feb. 17, 2004

(54) GRANULAR PUMP

(75) Inventor: Ronald M. Odessa, Batavia, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 0 days.

(21) Appl. No.: 10/102,795

(22) Filed: Mar. 21, 2002

(65) Prior Publication Data

US 2002/0158090 A1 Oct. 31, 2002

Related U.S. Application Data

(60) Provisional application No. 60/277,445, filed on Mar. 21, 2001.

(51) Int. Cl.[7] .......................... B05B 11/02; A01C 15/00

(52) U.S. Cl. ............................ 222/1; 222/631; 239/650

(58) Field of Search ................................ 222/175, 631, 222/632, 633; 239/650, 652, 653, 654, 320, 152, 153

(56) References Cited

U.S. PATENT DOCUMENTS 600,547 A * 3/1898 Mazzanovich .............. 222/633
1,723,715 A * 8/1929 Waters, Jr. ............... 239/416.5
1,755,329 A * 4/1930 McCormack ............... 239/654
2,950,564 A * 8/1960 Bonine ....................... 222/631
3,045,388 A * 7/1962 Hauser ........................ 29/272
3,606,097 A 9/1971 Wall
3,937,366 A 2/1976 Steiman
3,957,178 A 5/1976 Steiman
4,034,900 A 7/1977 Hafele
4,071,170 A 1/1978 Gunzel, Jr. et al.
4,256,241 A 3/1981 Mesic
4,281,780 A 8/1981 Lagani, Jr.
4,387,852 A 6/1983 Mattson et al.
4,474,327 A 10/1984 Mattson et al.
4,522,340 A 6/1985 Gandrud
4,628,644 A 12/1986 Somers
4,678,377 A 7/1987 Bouchard
4,705,191 A 11/1987 Itzel et al.
5,082,148 A 1/1992 Dunning
5,850,948 A 12/1998 Garcia et al.
6,206,223 B1 3/2001 Wicker
6,209,759 B1 4/2001 Hermouet et al.

* cited by examiner

*Primary Examiner*—Kevin Shaver
*Assistant Examiner*—Stephanie Willatt
(74) *Attorney, Agent, or Firm*—Jaeckle Fleischmann & Mugel, LLP

(57) ABSTRACT

A granular pump that includes a dispersion reservoir, a primary reservoir, a manual air pump, and a one-way valve.

The user aims the granular pump in the direction of the area to be sprayed with the granular material contained in the granular pump and operates the manual air pump to force a pneumatic pulse through the one-way valve into the dispersion reservoir. The pneumatic pulse into the dispersion reservoir permeates the granular material in the dispersion reservoir and carries the granular material through the second open end of the dispersion reservoir. The velocity of the granular material causes it to spread out in a substantially constant pattern of application. The granular material is continually gravity fed into the dispersion reservoir from the primary reservoir as the user operates the manual air pump while aiming at different locations to be sprayed with granular material until the primary reservoir is empty.

11 Claims, 3 Drawing Sheets

GRANULAR PUMP

CROSS-REFERENCE TO RELATED APPLICATIONS

This application claims the benefit of U.S. Provisional Patent Application Ser. No. 60/277,445, filed Mar. 21, 2001.

TECHNICAL FIELD

The present invention relates to applicator pumps, in particular, to portable, hand-held, granular applicator pumps for use in dispersing coarse and/or fine granules, pellets and the like.

BACKGROUND OF THE INVENTION

Most fine and/or coarse granules, pellets and the like, for example, calcium de-icers, fertilizers, grass seed, and weed killers are dispersed with a hand-held shaker, a handheld crank type applicator or a wheeled push cart type applicator. However, each of these modes of dispersing granular material have their own inherent disadvantages.

Coarse and/or fine granules, pellets and the like (hereinafter referred to simply as "granules" or "granular materials") are often applied by a shaker container having a plurality of holes located on the top portion of the container, where the user applies the granular material by inverting the container and shaking it over the target area. One disadvantage to this delivery of particulate material is that it results in an erratic dispersion pattern with piles of granules form in some areas and granules are sparse in other areas. Also, it is difficult to disperse granular material into hard to reach areas such as tight corners or under shrubs using this manner of delivery.

Granules can also be applied by a handheld crank type applicator or a wheeled push cart type applicator, each typically offer good dispersion of granules, but are normally expensive and cumbersome to use and store. The hand-held crank units normally are used with a shoulder or neck strap to stabilize the unit while the user holds the unit with one hand and cranks the unit with the other hand. A fan type apparatus picks up the granules and throws the granules outward. The rotational cranking action causes the unit to rock form side to side, which creates a need for stabilizing this unit with a strap and holding the unit by hand while operating the crank.

Like the disadvantages associated with the shaker container, it is also very difficult to disperse granules into hard to reach areas such as tight corners or under shrubs, with both the handheld crank type applicator and wheeled push cart type applicator. Additionally, handheld crank type applicators and wheeled push cart type applicators have their own disadvantages because they are structurally more complicated than simple shaker containers, and are more difficult to clean or to keep clean. Moreover, the more complicated the applicator device is, the higher the cost of producing the device.

Therefore, what is needed in the art is a portable apparatus that provides an even dispersion of coarse and/or fine granules.

Moreover, what is needed in the art is a portable apparatus that is easy to stabilize and control.

Furthermore, what is needed in the art is a portable apparatus that is capable of reaching and covering a desired target area with a dispersion of coarse and/or fine granules.

Still further, what is needed in the art is a portable apparatus that is easy to charge, empty, and clean.

SUMMARY OF THE INVENTION

The present invention provides a portable, hand-held, granular applicator pump for use in dispersing coarse and/or fine granules.

One embodiment of the invention comprises a dispersion reservoir including a wall, a first open end and a second open end. An intake portion is affixed to or integral with the dispersion reservoir, and the intake portion has a threaded inner surface and a bottom that penetrates the wall of the dispersion reservoir. Thereby, the intake portion permits passage of granular material between the intake portion and the dispersion reservoir.

A primary reservoir has a container portion with a quantity of granular material and an outlet portion that is threaded for cooperation with the intake portion. Thus, the primary reservoir gravity feeds the granular material through the intake portion to the dispersion reservoir.

A one way valve is disposed within the first open end of the dispersion reservoir. The one-way valve permits air passage into the dispersion reservoir through the first open end and precludes substantially all materials from exiting the dispersion reservoir through the first open end.

A manual air pump includes an air reservoir that is affixed to or integral with the first open end of the dispersion reservoir and a plunger assembly that is at least partially disposed within the air reservoir. The plunger assembly is operable to increase air pressure in the air reservoir to thereby force a blast of air through the one-way valve into the dispersion reservoir. The blast of air carries the granular material in the dispersion reservoir through the second open end of the dispersion reservoir. The velocity of the air blast and granules as they pass through the second open end disperses the granular material in a substantially even distribution.

An advantage of the present invention is that it provides an even dispersion of coarse and/or fine granules.

A further advantage of certain embodiments of the present invention is that it is easy to stabilize and control the dispersion of granules.

A still further advantage of certain embodiments of the present invention is that it is capable of reaching and covering a desired target area with a dispersion of coarse and/or fine granules.

An even further advantage of the present invention is that it is easy to fill, empty, and clean.

BRIEF DESCRIPTION OF THE DRAWINGS

The above-mentioned and other features and advantages of this invention, and the manner of attaining them, will become apparent and be better understood by reference to the following description of one embodiment of the invention in conjunction with the accompanying drawings, wherein.

Corresponding reference characters indicate corresponding parts throughout the several views. The exemplification set out herein illustrates an embodiment of the invention and such an exemplification is not to be construed as limiting the scope of the invention in any manner.

DESCRIPTION OF THE PREFERRED EMBODIMENTS

Figure 1:
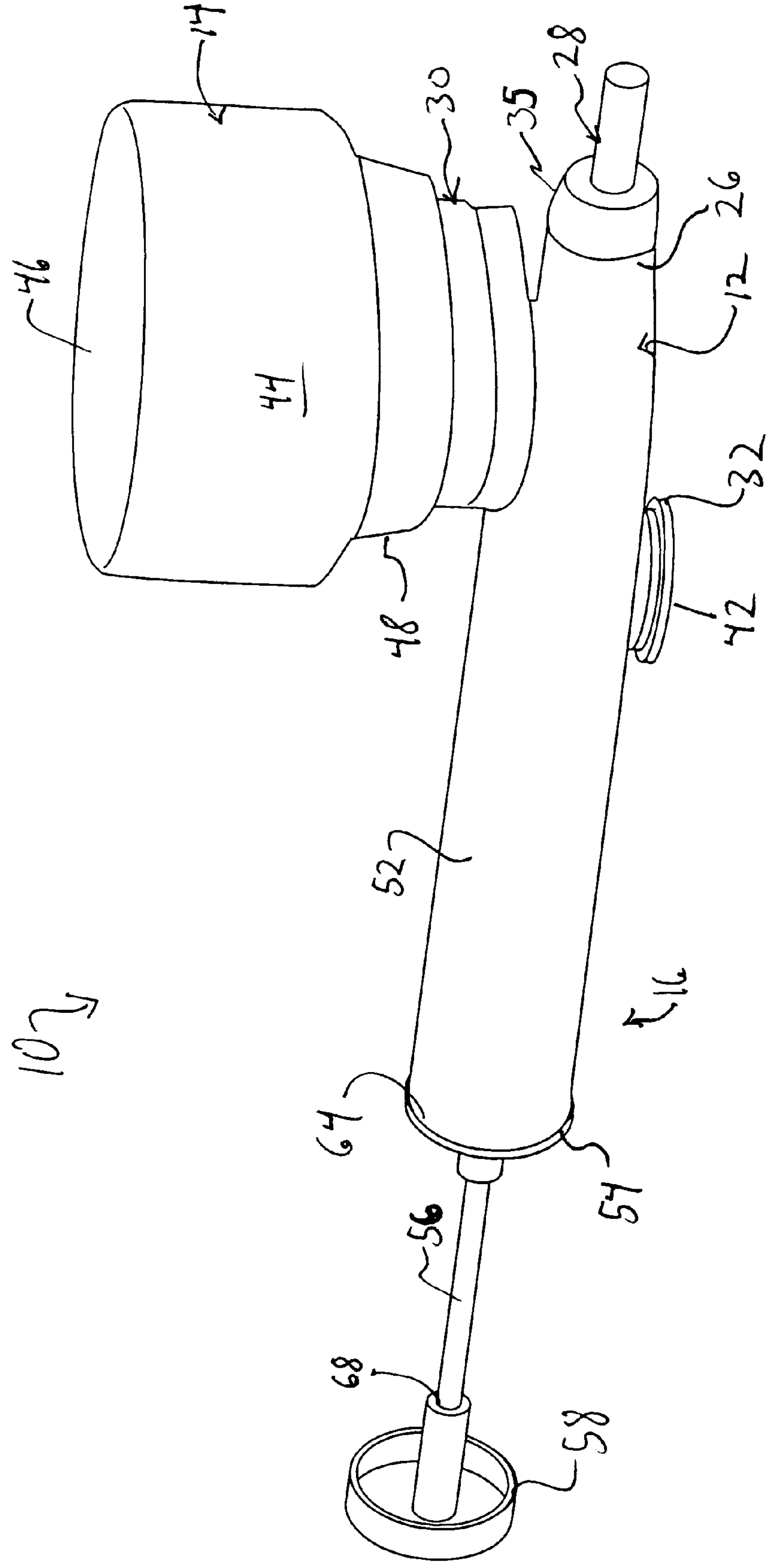
FIG. 1 is an isometric view of one embodiment of a granular pump of the present invention.
Figure 2:
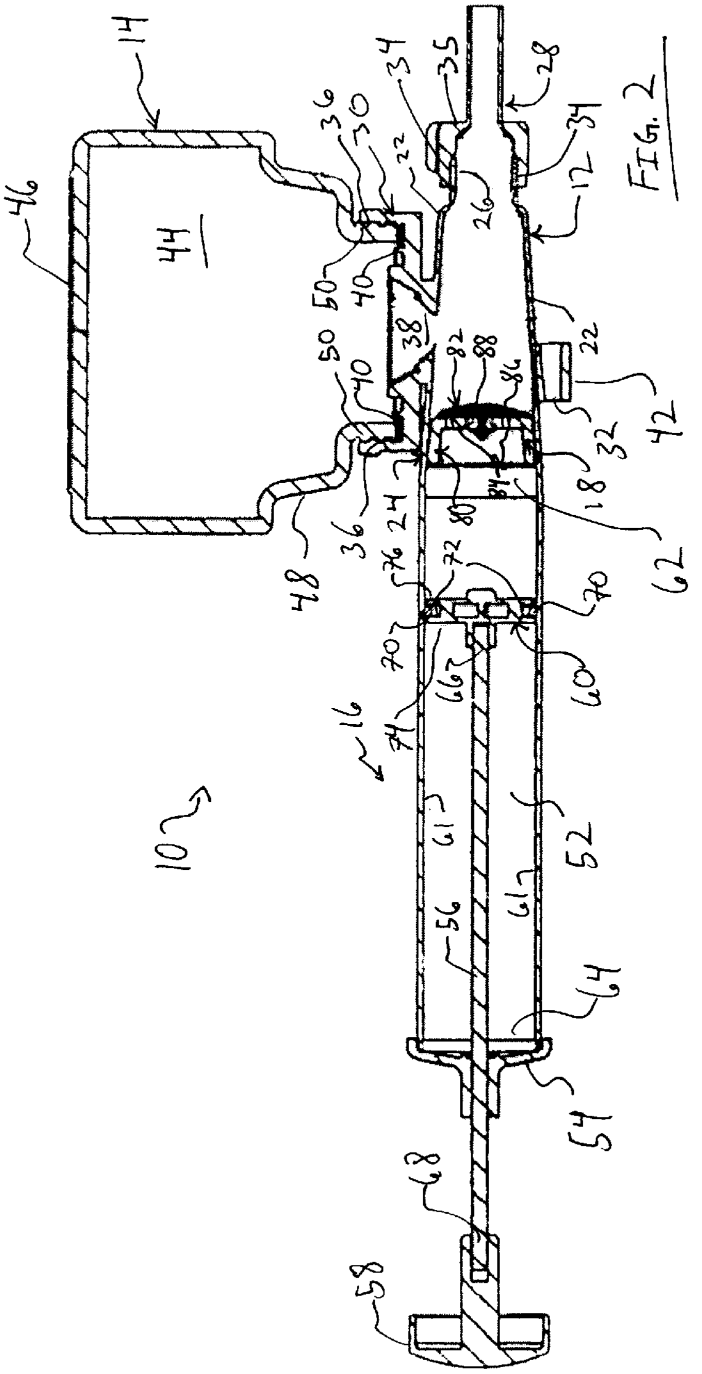
FIG. 2 is a longitudinal cross-sectional view of the granular pump of FIG. 1.

Referring now to the drawings, and particularly to FIGS. 1 and 2, there is shown an embodiment of a portable granular applicator pump of the present invention. Granular pump 10 includes a dispersion reservoir 12, a primary reservoir 14, a manual air pump 16, and a one-way valve 18.

Referring now to FIG. 2, the dispersion reservoir 12 includes a dispersion reservoir wall 22, a first open end 24, a second open end 26, a removable nozzle 28, an intake portion 30, and a base 32. The dispersion reservoir 12 is substantially conical in shape, having a diameter that gradually diminishes from the first open end 24 to the second open end 26. The dispersion reservoir 12 is made of a substantially rigid material such as molded plastic. The second open end 26 includes a threaded outer surface 34. The removable nozzle 28 includes a threaded end 35 that is threaded for cooperation with the threaded outer surface 34 of the second open end 26. The intake portion 30 is affixed to or integral with the dispersion reservoir wall 22 and includes a threaded inner surface 36, a funnel 38 and a gasket 40 that is made of a flexible material such as rubber. The funnel 38 penetrates the dispersion reservoir wall 22 and guides the flow of material into the dispersion reservoir 12. The base 32 is affixed to or integral with the dispersion reservoir wall 22 and includes a bottom surface 42, which is substantially flat for supporting the granular pump 10 on a substantially level surface such as a table, shelf, or floor. The base 32 is positioned such that the bottom surface 42 is substantially opposite to the intake portion 30.

The primary reservoir 14 is made of a substantially rigid material such as molded plastic and includes a container portion 44, a closed end 46, a tapered portion 48, and a threaded mouth 50. The container portion 44 is substantially cylindrical in shape and terminates in the closed end 46. The tapered portion 48 is affixed to or integral with the container portion 44 and has a diameter diminishing from the container portion 44 to the threaded mouth 50. The threaded mouth 50 is threaded for cooperation with the threaded inner surface 36 of the intake portion 30.

Figure 3:
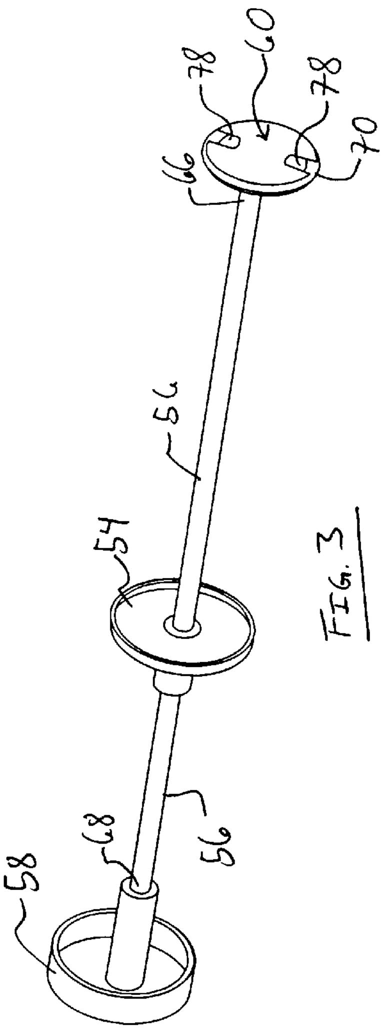
FIG. 3 is an isometric view of the plunger assembly of the granular pump of FIG. 1.

The manual air pump 16 includes an air reservoir 52, a guide cap 54, a connecting rod 56, a handle 58, and a piston 60. The air reservoir 52 is made of substantially rigid material such as molded plastic. The air reservoir 52 is substantially cylindrical in shape and open at both ends and includes an inner surface 61, a first end 62, and a second end 64. The first end 62 of the air reservoir 52 is affixed to or integral with the first open end 24 of the dispersion reservoir 12. The guide cap 54 is securely and removable attached to the second end 64 of the air reservoir 52 such as by a snap-on or a screw-on configuration. The connecting rod 56 is made of a substantially rigid material such as metal and includes an inner end 66 and an outer end 68. The connecting rod 56 slidably extends through substantially the center of the guide cap 54 such that the inner end 66 of the connecting rod 56 is contained within the air reservoir 52 and the outer end 68 of the connecting rod 56 is outside the air reservoir 52. The handle 58 is attached to or integral with the outer end 68 of the connecting rod 56. As best seen in FIG. 3, the piston 60 is attached to or integral with the inner end 66 of the connecting rod 56, is substantially circular, and is slidable within the air reservoir 52. The piston 60 includes an o-ring 70, a groove 72 with a rear flange 74 and a forward flange 76, and vents 78. The o-ring 70 fits loosely within the groove 72 and engages the inner surface 61 of the air reservoir 52. The vents 78 penetrate forward the flange 76 and do not penetrate the rear flange 74.

Referring again to FIG. 2, the one-way valve 18 separates the air reservoir 52 of the manual air pump 16 from the dispersion reservoir 12 and permits the passage of fluid from the air reservoir 52 to the dispersion reservoir 12 only. The one-way valve 18 includes a valve seat 80 and a stopper 82. The valve seat 80 is substantially rigid and integral with or affixed to the dispersion reservoir wall 22 and includes perforations 84. The stopper 82 is made of a somewhat pliable material such as rubber and includes a stopper disk 86 and a retaining tab 88. The stopper disk 86 covers all of the perforations 84 of the valve seat 80. The retaining tab 88 extends through the valve seat 80 to thereby the retain stopper 82 and bias the stopper disk 86 against the valve seat 80.

In use, an empty primary reservoir 14 is removed from the intake portion 30 and a full primary reservoir 14, containing granular materials, is attached to the intake portion 30 by inverting the granular pump 10 and screwing the threaded inner surface 36 of the intake portion 30 onto the threaded mouth 50 of the primary reservoir 14 until the threaded mouth 50 engages the gasket 40 of the intake portion 30 to thereby form a seal that substantially prevents the loss of the granular material contained within the primary reservoir 14. Alternatively, the empty primary reservoir 14 is filled with granular material and then attached to the intake portion 30 in the same manner. For course granular material, the removable nozzle 28 is removed from the threaded outer surface 24 of the first open end 24 of the dispersion reservoir 12. For fine granular material, the removable nozzle 28 is screwed onto the threaded outer surface 24 of the first open end 24 of the dispersion reservoir 12.

The granular pump 10, now including the primary reservoir 14, is returned to the upright position, thereby gravity feeding the contents of the primary reservoir 14 to the dispersion reservoir 12. More particularly, as the granular pump 10 is rotated to the upright position, gravity acts on the granular material contained by the primary reservoir 14 such that the granular material flows from the container portion 44 past the tapered portion 48 of the primary reservoir 14 and through the funnel 38 of the intake portion 30 into the dispersion reservoir 12. The inclined surfaces of the tapered portion 48 of the primary reservoir 14 and the funnel 38 of the intake portion 30 guide the granular material and substantially reduce accumulation and clogging.

Initially, the handle 58 of the manual air pump 16 is proximate the guide cap 54. Thus the piston 60 is substantially as far forward within the air reservoir 52 as allowed by the manual air pump 16. The user pulls on the handle 58 to thereby pull on the piston 60 via the connecting rod 56. As the piston 60 is drawn through the air reservoir 52, friction between the o-ring 70 and the inner surface 61 of the air reservoir 52 forces the o-ring 70 against the forward flange 76 of the piston 60. Air flows between the rear flange 74 and the inner surface 61, into the groove 72, and through the vents 78 to the portion of the air reservoir 52 now forward of the piston 60 thereby charging the air reservoir 52 with air. The handle 58 is drawn back in this manner until the piston 60 is proximate the guide cap 54.

The user aims the second open end 26 of the dispersion reservoir 12 in the direction of the area to be sprayed with the granular material contained in the granular pump 10. The user pushes the handle 58, thereby sliding the piston 60 forward within the air reservoir 52. Friction between the o-ring 70 and the inner surface 61 of the air reservoir 52 forces the o-ring 70 against the rear flange 74 forming a substantially air-tight seal between the piston 60 and the inner surface 61 of the air reservoir 52. As the piston 60 slides forward within the air reservoir 52, the air pressure in the air reservoir 52 in front of the piston 60 increases. Therefore, the air pressure increases in the perforations 84 of the valve seat 80 and pushes against the stopper disk 86 thereby opening the one-way valve 18. Thus, air blasts from the air reservoir 52 into the dispersion reservoir 12. The guide cap 54 permits air to enter the air reservoir 52 as the piston 60 slides forward to prevent a vacuum from forming therebetween.

The air blast into the dispersion reservoir 12 created by the piston 60 sliding toward the first end 62 of the air reservoir 52 permeates the granular material in the dispersion reservoir 12 and carries the granular material through the second open end of the dispersion reservoir 12. If the removable nozzle 28 is in place on the second open end 26 such as in the case that fine granular material is used, the airflow carries the granular material from the second open end 26, through the removable nozzle 28 and into the ambient air. The velocity of the granular material causes the granular material to spread out in a substantially constant pattern of application. Alternatively, if the removable nozzle 28 is not in place on the second open end of the dispersion reservoir 12 such as in the case that course granular material is used, the airflow carries the granular material into the ambient air directly from the second open end 26 and the velocity of the granular material causes the granular material to spread out in a substantially constant pattern of application.

The user pushes the handle 58 and thus the piston 60 forward until the handle 58 is proximate the guide cap 54. The granular material is continually gravity fed into the dispersion reservoir 12 from the primary reservoir 14 as described above. The user continually reciprocates the handle 58 and thus the piston 60 while aiming at different locations to be sprayed with granular material until the primary reservoir 14 is empty.

In the embodiment shown, the piston 60 is configured such that the o-ring 70 fits loosely within the groove 72. Alternatively, the o-ring 70 fits snugly within the groove 72 and forms a substantially air-tight seal regardless of the direction the piston 60 is sliding. Also, the air reservoir 52 includes a one-way valve between the air reservoir 52 and the ambient air positioned such that it permits fluids to enter the air reservoir 52.

Figure 4:
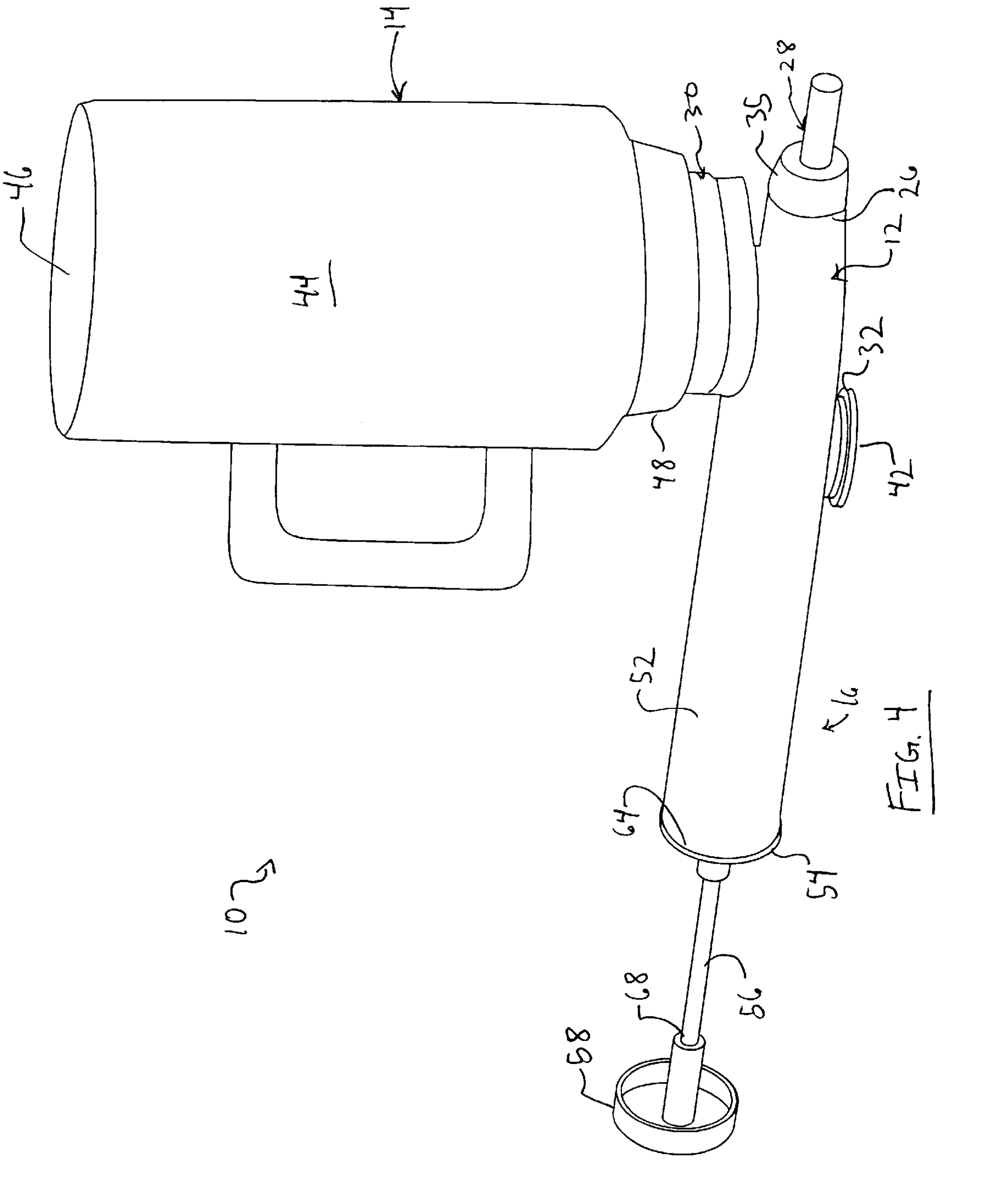
FIG. 4 is a isometric view of the granular pump of FIG. 1 with a large primary reservoir.

In the embodiment shown, the primary reservoir 14 is a compact container. Alternatively, the primary reservoir 14 is any size. In the case that the primary reservoir 14 is large enough to make the granular pump 10 top heavy and awkward to use, the primary reservoir 14 includes a handle that is affixed to or integral with the primary reservoir 14, as shown in FIG. 4. Further, a threaded adapter is used with the intake portion 30 to accommodate a primary reservoir 14 with a mouth size and thread configuration that is incompatible with the intake portion 30.

In the embodiment shown, the base 32 is shown as a flat disk attached to the dispersion reservoir 12. Alternatively, the base 32 has a substantially rectangular shape.

It should be particularly noted that an end cap may be provided for cooperation with the removable nozzle 28 or the second open end 26 to prevent spillage of the granular material when the granular pump 10 is not in use. Also, in a preferred embodiment, the removable nozzle 28 is interchangeable with a variety of other nozzles having different shapes and inner diameters.

Furthermore, the manual air pump 16, the dispersion reservoir 12, and the removable nozzle 28 are all in-line. Thus, motion is in one direction making it easy to control and stabilize the granular pump 10 and target a specific area whereas these are difficult with the granular applicators discussed in the background.

Also, in certain embodiments all internal walls of the granular pump 10 through which granular flow is required, are tapered to prevent the granular material from gathering and potentially plugging the granular pump 10.

The granular pump 10 may be made from a variety of materials including, but not limited to various plastics, metals, and combinations thereof.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed:

1. A granular applicator comprising:

a dispersion reservoir including a wall, a first open end, a second open end, and an inner surface;

a primary reservoir capable of holding a quantity of granular material, said primary reservoir attached to said dispersion reservoir and penetrating the wall of said dispersion reservoir to thereby feed the granular material to said dispersion reservoir; and a manual air pump configured for pulsing pneumatic waves of air through the first open end of said dispersion reservoir to carry the granular material in said dispersion reservoir through the second open end of said dispersion reservoir;

a one-way valve disposed within the first open end of said dispersion reservoir, said one-way valve permitting air passage into said dispersion reservoir through the first open end and precluding substantially all materials from exiting said dispersion reservoir through the first open end, said one-way valve comprising:

a valve seat having an outer circumference and a perforated interior, the outer circumference of said valve seat is integral with or affixed to the inner surface of said dispersion reservoir proximate the first open end of said dispersion reservoir in a substantially air-tight manner; and a stopper having a stopper disk and a retaining tab, the stopper disk covers the perforated interior of said valve seat, and the retaining tab penetrates the interior of said valve seat biasing the stopper disk against said valve seat, thereby precluding substantially all materials from exiting said dispersion reservoir through the first open end.

2. The granular applicator according to claim 1, wherein said manual air pump includes an air reservoir and a plunger assembly, the air reservoir being affixed to or integral with the first open end of said dispersion reservoir, the plunger assembly being at least partially disposed within the air reservoir, and being operable to increase air pressure in the air reservoir to thereby force a pneumatic pulse through said one-way valve into said dispersion reservoir, the said pneumatic pulse carrying the granular material in said dispersion reservoir through the second open end of said dispersion reservoir.

3. The granular applicator according to claim 2, wherein the air reservoir of said manual air pump is substantially cylindrical in shape and has a substantially constant diameter.

4. The granular applicator according to claim 2, wherein the air reservoir of said manual air pump has an inner surface and the plunger assembly of said manual air pump comprises:

a guide cap for attachment to an open end of the air reservoir;

a substantially rigid rod extending through said guide cap in a slidable manner, said rod having a first end outside the air reservoir and a second end inside the air reservoir;

a hand grip affixed to or integral with the first end of said rod; and a piston affixed to or integral with the second end of said rod, said piston slidable in the air reservoir and includes an O-ring for forming a substantially air-tight seal with the inner surface of the air reservoir.

5. The granular applicator according to claim 1, further comprising a base with a substantially flat undersurface affixed to said dispersion reservoir.

6. The granular applicator according to claim 1, wherein said dispersion reservoir is substantially conical in shape and has a diameter gradually diminishing from the first open end to the second open end of said dispersion reservoir.

7. The granular applicator according to claim 1, wherein the second open end of said dispersion reservoir has a threaded outer surface.

8. The granular applicator according to claim 7, further comprising a removable nozzle threaded for cooperation with the threaded outer surface of the second open end of said dispersion reservoir, said removable nozzle including a push on cap for closing said removable nozzle when said granular applicator is not in use.

9. The granular applicator according to claim 1, wherein said primary reservoir includes a container portion and an outlet portion substantially conical in shape and has a diameter diminishing from the container portion.

10. The granular applicator according to claim 1, wherein said primary reservoir is sufficiently large to cause said granular applicator to be unstable, said primary reservoir includes a handle for user control of said granular applicator.

11. A method for spreading granular material, comprising:

providing a dispersion reservoir having a first open end, a second open end, and an inner surface;

gravity feeding a quantity of granular material to said dispersion reservoir;

limiting the direction of airflow through the first open end of said dispersion reservoir such that fluids are permitted to enter said dispersion reservoir through the first open end and substantially all materials are precluded from exiting said dispersion reservoir through the first open end;

increasing the air pressure outside the first open end of said dispersion reservoir to thereby force a blast of air into said dispersion reservoir through the first open end, the blast of air carrying the granular material in said dispersion reservoir through the second open end of said dispersion reservoir and dispersing the granular materials in a substantially even distribution; and said step of limiting the direction of airflow is carried out with a one-way valve positioned such that fluids are permitted to enter said dispersion reservoir and substantially all materials are precluded from exiting said dispersion reservoir through the first open end of said dispersion reservoir, said one-way valve comprising:

a valve seat having an outer circumference and a perforated interior, the outer circumference of said valve seat is integral with or affixed to the inner surface of said dispersion reservoir proximate the first open end of said dispersion reservoir in a substantially air-tight manner; and a stopper having a stopper disk and a retaining tab, the stopper disk covers the perforated interior of said valve seat, and the retaining tab penetrates the interior of said valve seat biasing the stopper disk against said valve seat, thereby precluding substantially all materials from exiting said dispersion reservoir through the first open end.

* * * * *